United States Patent [19]

Sherwood

[11] Patent Number: 4,756,328
[45] Date of Patent: Jul. 12, 1988

[54] FUEL TANK PROTECTION VALVE

[75] Inventor: Carl H. Sherwood, Brockport, N.Y.

[73] Assignee: General Motors Corporation, Detroit, Mich.

[21] Appl. No.: 38,961

[22] Filed: Apr. 16, 1987

[51] Int. Cl.⁴ ............................................. F16K 17/36
[52] U.S. Cl. ..................................... 137/39; 137/43; 137/45
[58] Field of Search ..................... 137/38, 39, 43, 45

[56] References Cited

U.S. PATENT DOCUMENTS 2,343,663  3/1944  Gregory ........................... 137/45
3,765,435  10/1973  Schlansky .
3,768,498  10/1973  Urban .
3,916,928  11/1975  Enoch .
4,050,471  9/1977  Anhegger .

FOREIGN PATENT DOCUMENTS 2932076  2/1981  Fed. Rep. of Germany ........ 137/45
50574  2/1966  Poland ................................... 137/45

Primary Examiner—Robert G. Nilson
Attorney, Agent, or Firm—Patrick M. Griffin

[57] ABSTRACT

A fuel tank protection valve includes a pendulum type weight that hangs within a bearing socket located below the vent line opening in a fuel tank vapor collection dome. When the vehicle tilts significantly from the horizontal, the weight pivots within the socket, kicking a float ball up to seal the vent line opening. The closing angle of the valve may be easily varied, without changing the shape or size of the bearing socket, by varying the offset from the socket pivot point of the bearing socket of an extension of the weight that actually engages the float ball.

1 Claim, 1 Drawing Sheet

FUEL TANK PROTECTION VALVE

This application relates to vehicle fuel systems in general, and specifically to a fuel tank valve that prevents liquid fuel from escaping the tank through a vent line opening in the vent of either fuel overfill or excessive vehicle tilting.

BACKGROUND OF THE INVENTION

Typical modern vehicle fuel systems include a fuel vapor recovery system in which fuel vapors are collected from the fuel tank to be stored in a vapor storage canister, from which they are later purged and burned in the engine. The fuel tank has a fuel vapor colelction dome at the top, through which is connected a fuel vapor vent line that runs to the vapor storage canister. Should the tank be overfilled, there is the possibility that liquid fuel could contaminate the vapor storage canister through the vent line. This could also occur in the event of vehicle rollover, or even excessive tilting of the vehicle from the horizontal.

The prior art shows several examples of a basic protection valve design to protect against each possibility. The basic design consists of a fuel receiving chamber inside the tank and located beneath the vent line opening. A ball shaped or conical weight sits within the chamber, resting on a conically shaped lower wall of the chamber. A float sits between the weight and the vent line opening, resting on the top of the weight spaced from the vent line opening. When the vehicle tank has a normal fuel level and is not tilted excessively from the horizontal, the vent line opening is unblocked, and fuel vapors that form in the tank are collected in the dome, exiting through the vent line to the canister. Should the fuel tank be overfilled, the float moves up off of the weight with the rising fuel, and is guided by the interior wall of the chamber into sealing engagement with the vent line opening, to prevent the escape of liquid fuel. Should the vehicle tilt sufficiently that the conical lower wall of the chamber moves beyond the horizontal, then the weight can roll or slide along the conical wall to push the float into the same sealing engagement.

While the basic design described above works, it does have some design limitations. It is desirable that the valve not close off unless the vehicle has tilted to excess, so that the tank may vent freely when the vehicle is in a normal attitude. The angle of tilt beyond which it is desired to shut off the vent line, which may be referred to as the closing angle, in turn determines the angle of the conical lower chamber wall. The basic valve described will not respond at all until the conical wall has moved beyond the horizontal, at which point the valve closes as quickly as the weight can roll or slide along the chamber conical wall. It is desirable also, for good venting, that the float sit sufficiently below the vent line opening that the fuel vapors have good access to the opening, and so that the float will not bounce up intermittently and close the opening off. This may be referred to as the float's normal distance. Consequently, the weight must move toward the vent line opening at least that normal distance in order to in turn push the float against the opening. Since the conical wall has a predetermined angle, it must be also sufficiently wide to allow the mass to move that far, so there is an inherent limit on how compact it may be. Providing a different closing angle would also require a differently shaped and potentially wider conical wall.

SUMMARY OF THE INVENTION

The invention provides an overfill and tilt protection valve that does not have the limitations of the basic design described above. A fuel receiving chamber comprised of four depending ribs is mounted within the tank, located below the vent line opening. A spherical bearing socket is supported by the ribs, below and spaced from the vent line opening. A pendulum weight is seated within the bearing socket, hanging down through the socket so as to swing and pivot therewithin. Since the center of gravity of the pendulum weight is below the pivot point of the bearing socket, the weight responds and pivots essentially immediately as the fuel tank tilts from the horizontal. In the embodiment disclosed, the pendulum weight also includes a generally cup shaped sleeve having an extension in the form of a flared upper circular edge that is offset from the pivot point of the bearing socket. A float ball is contained within the chamber, seated on the upper edge of the pendulum weight below the vent line opening.

The distance that the float ball normally rests beneath the vent line opening is sufficient to allow the fuel vapors to freely exit the tank. However, in the event that fuel rises sufficiently to flow between the ribs, the float ball moves upwardly, guided by the ribs into sealing engagement against the vent line opening. Furthermore, should the vehicle tilt at all from the horizontal, the float is kicked upwardly by the upper edge of the pendulum weight as it pivots within the spherical bearing socket, closer to the vent line opening. The float ball will engage and seal the vent line opening when the vehicle has tilted sufficiently from the horizontal. The pendulum pivots almost immediately with any horizontal tilt, so there is no threshold closing angle beyond which the vehicle must tilt in order for the valve to respond. Since the pendulum weight responds to vehicle tilt with a twisting action, rather than with a rolling or sliding action as in the conventional valve described above, the bearing socket may be inherently more compact than the conical cup of the convention valve. Also, since the pendulum weight will kick the float ball up toward the vent line opening a greater or lesser distance as the offset of the circular edge of the weight from the bearing socket pivot point is increased or decreased, the invention has much more design flexibility than the conventional valve. The angle at which the valve will close, for a given normal distance, may be easily varied simply by varying the offset of the upper edge of the pendulum weight sleeve from the pivot, without varying the bearing socket. In the conventional design, a conical cup with a different angle would be necessary. Likewise, for a given closing angle, the normal distance may be similarly varied, without varying the bearing socket.

It is, therefore, a general object of the invention to provide a fuel tank protection valve that is inherently more compact and has a greater design flexibility.

It is another object of the invention to provide a valve of the type described that includes a bearing socket and a pendulum weight that responds with a twisting action essentially immediately as the vehicle tilts from the horizontal.

It is yet another object of the invention to provide a valve of the type described in which the pendulum weight has an extension which is offset from the pivot point of the bearing socket, an offset that may be easily varied so that the closing angle or normal distance of the valve may be easily varied without changing the shape or size of the bearing socket.

DESCRIPTION OF THE PREFERRED EMBODIMENT

These and other objects and features of the invention will appear from the following written description, and from the drawings, in which.

Figure 1:
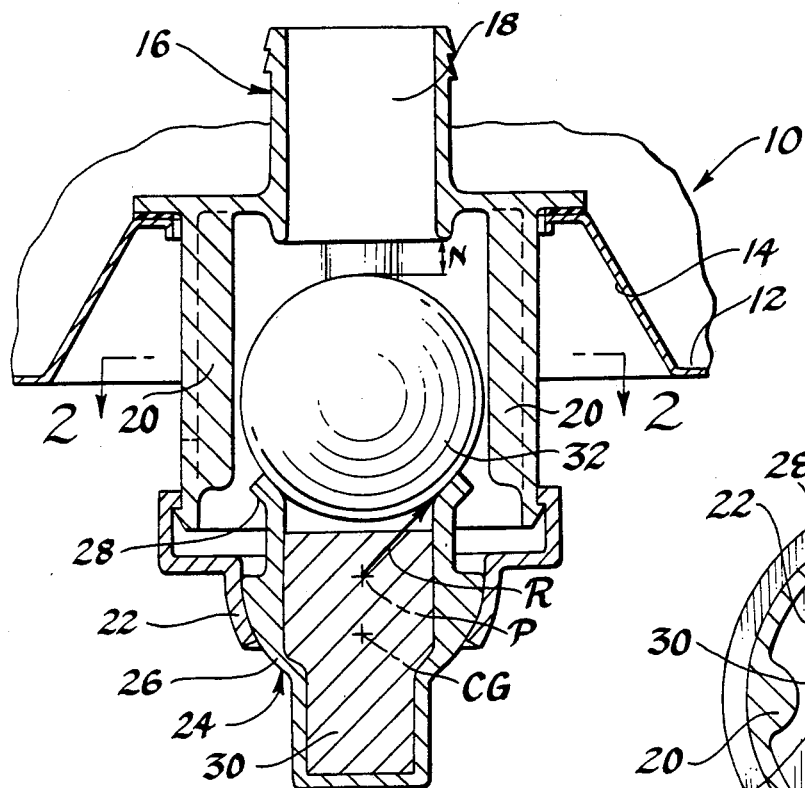
FIG. 1 is a cross-sectional view of the valve when the fuel is at a normal level, and when the fuel tank is not significantly tilted from the horizontal.
Figure 2:
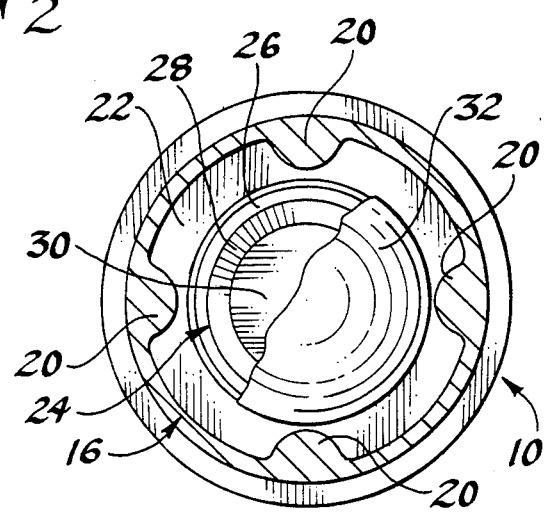
FIG. 2 is a sectional view taken along the line 2—2 of FIG. 1.

Referring first to FIGS. 1 and 2, a preferred embodiment of the valve of the invention, designated generally at 10, is shown in its normal open position. Valve 10 is mounted within a vehicle fuel tank, which is indicated generally at 12. Specifically, valve 10 is mounted within a vapor collection dome of tank 12, indicated at 14. A fitting, designated generally at 16, extends down through dome 14 and defines a central vent line opening 18. A conventional vent line would run from opening 18 to a conventional vapor storage canister. A fuel receiving chamber is defined by four ribs 20 that depend from fitting 16 below vent line opening 18. A spherical bearing socket 22 is supported at the lower end of ribs 20, below and spaced from vent line opening 18. The geometric pivot or center point of socket 22 is indicated at P. A pendulum weight, designated generally at 24, includes a generally cylindrical and hollow outer sleeve 26 that seats closely within the bearing socket 22, and which has a flared, generally circular upper edge 28. The interior of sleeve 26 is filled with lead or other dense material 30. Pendulum weight 24 hangs vertically down through socket 22 with the axis of sleeve 24 essentially parallel to the ribs 20, when the tank 12 is not tilted from the horizontal, as seen in FIG. 1. Pendulum weight 24 hangs down far enough that its center of gravity, designated at CG, is spaced from and below the pivot point P of socket 22. Completing the valve 10, a float ball 32 of buoyant material is located between the pendulum weight 24 and the vent line opening 18. The diameter of float ball 32 is such that it normally rests centered within the cup provided by the sleeve's flared upper ege 28, centered between the ribs 20 with a slight clearance. The edge 28 contacts float ball 32 at a radius from the pivot point designated R. The radius R, in turn, has a certain offset, in the horizontal direction, from the pivot point P. The vertical distance that float ball 32 normally rests below the vent line opening 18 is designated at N. The normal distance N is sufficient to allow fuel vapors to freely exit the tank 12 through the vent line opening 18. However, in the event that fuel should rise sufficiently to flow between the ribs 20, the float ball 32 will move upwardly away from the edge 28, guided by the ribs 20 into sealing engagement against the vent line opening 18, thereby preventing raw fuel from exiting tank 12 and contaminating the canister.

Figure 3:
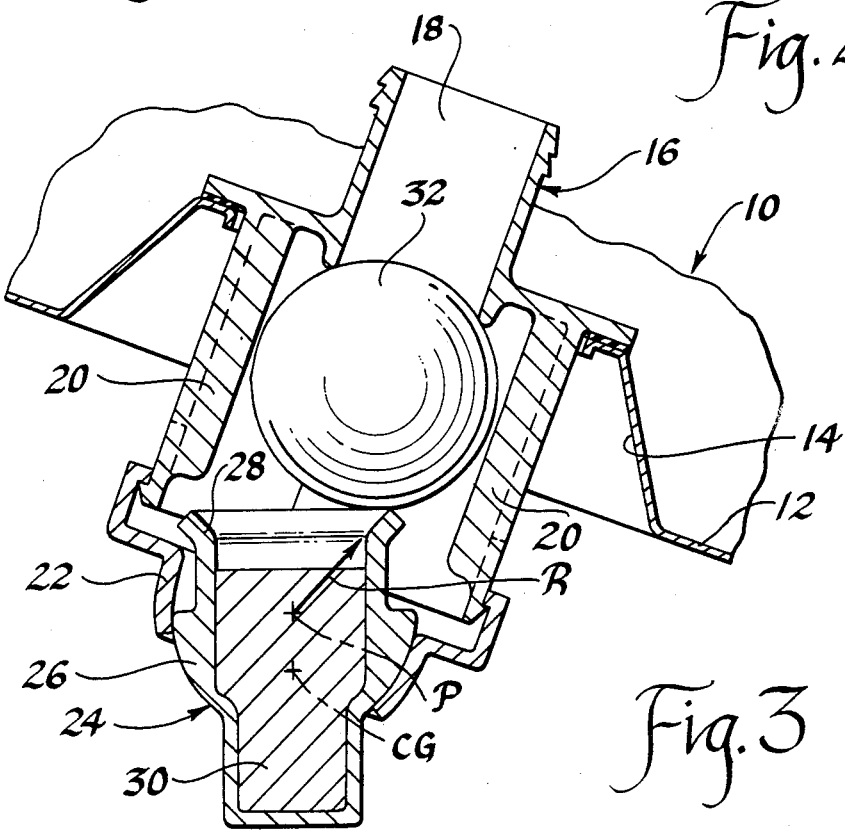
FIG. 3 is a view similar to FIG. 1, but showing the fuel tank tilted to the point where the valve has closed.

Referring next to FIG. 3, since the pendulum weight 24 center of gravity CG is below the pivot point P, weight 24 will remain substantially vertical under the force of gravity, as the vehicle and vehicle tank 12 tilt. Consequently, weight 24 will twist within socket 22, tilting relative to the ribs 20. The twisting action, as opposed to the conventional sliding or rolling action, means that weight 24 can respond essentially immediately when tank 12 tilts any significant amount from the horizontal, with no necessity that it tilt past a given closing angle. The force with which weight 24 so responds can be increased easily by lengthening sleeve 26 so as to lower its CG. As the weight 24 twists within socket 22, the float ball 32 is kicked upwardly by the flared edge 28, and is pushed closer to the vent line opening 18. The float ball 32 will engage and seal the vent line opening 18 when the vehicle has tilted sufficiently from the horizontal, as is shown in FIG. 3. Since the pendulum weight 24 responds with a twisting action, rather than with a rolling or sliding action as in the conventional valve described above, the bearing socket 22 may be inherently more compact. Another design advantage is that, for a given angle of twist, the edge 28 will kick the float ball 32 up toward the vent line opening 18 a greater or lesser distance as the horizontal offset of the circular edge 28 from the pivot point P is increased or decreased. That offset could be increased up to the point where the edge 28 was coincident with the equator of the float ball 32. The invention thus has much more design flexibility than the conventional valve. The angle at which the valve of the invention will close, for a given normal distance N, may be easily varied simply by varying the offset of the upper edge 28 from the pivot point P, without varying the bearing socket 22. Likewise, for a given closing angle, N could be as easily varied. In the conventional design, it would be necessary to vary the angle of the walls of the conical cup in order to create a different closing angle, potentially increasing its width, especially for shallow angle. Thus, in the invention, the fitting 16, ball 32, socket 22 and weight 24 constitute a subassembly for which the closing angle may be easily varied, all within the same basic space or envelope.

Variations of the embodiment disclosed may be made within the broad scope of the invention. If the pendulum weight did not have the upper edge 28, with its horizontal offset from the pivot point P, but sat directly on the top of the filler material 30 instead, there would still be an immediate response of the valve with any tilting from the horizontal. The closing angle could still be varied by varying the normal distance N. The normal distance N could be varied by shortening or lengthening the ribs 20, without varying or widening the socket 22. There would not be the same level of design flexibility provided by the ability to vary the horizontal offset of the edge 28 from the pivot point P, however. Likewise, some other member or extension on the weight 24 other than the flared edge 28 could provide an easily varied lever arm to kick up float ball 32 as the weight 24 twisted, such as a finger. The flared upper edge 28 does provide a convenient seat for the float ball 32, however. Therefore, it will be understood that the invention is not intended to be limited to the exact embodiment disclosed.

The embodiments of the invention in which an exclusive property or privilege is claimed are defined as follows:

1. A protection valve for a vehicle fuel system of the type that prevents liquid fuel from entering a fuel tank vent line opening in the event of excessive tilting of the vehicle tank from the horizontal or excessive fuel fill, while allowing fuel vapors to exit said tank through said vent line, said valve comprising, a fuel receiving chamber located within said tank below said vent line opening, a spherical bearing socket on said chamber spaced from said vent line opening and defining a pivot point, a float ball located within said chamber beneath said vent line opening, a generally cylindrical and hollow sleeve the exterior of which seats closely within said bearing socket and the interior of which is filled with a weight material having a center of gravity located below said pivot point, said sleeve further including a generally circular and flared upper edge located above said weight material so as to provide a supporting seat for said float ball beneath said vent line opening with a predetermined horizontal offset from said pivot point, said float ball normally being seated on said hollow sleeve upper edge and spaced from said vent line opening a sufficient distance to allow said fuel vapors to exit the tank through said vent line opening, but floating upwardly away from said upper edge and into sealing engagement with said vent line opening in the event that fuel rises sufficiently to fill said receiving chamber, said float ball also being pushed upwardly into engagement with said vent line opening by said sleeve upper edge when said vehicle tilts sufficiently from the horizontal and said weight filled sleeve pivots within said spherical bearing socket, said valve providing improved design flexibility by allowing the diameter of said upper edge, and therefor its horizontal offset from said pivot point, to be easily changed, thereby changing the degree of vehicle tilting necessary to close off said vent opening.

* * * * *